Sept. 22, 1959   A. G. SCHRAMM   2,905,481
MANUALLY OPERATED OPEN BED ELEVATABLE TRAILERS
Filed March 31, 1958   3 Sheets-Sheet 1
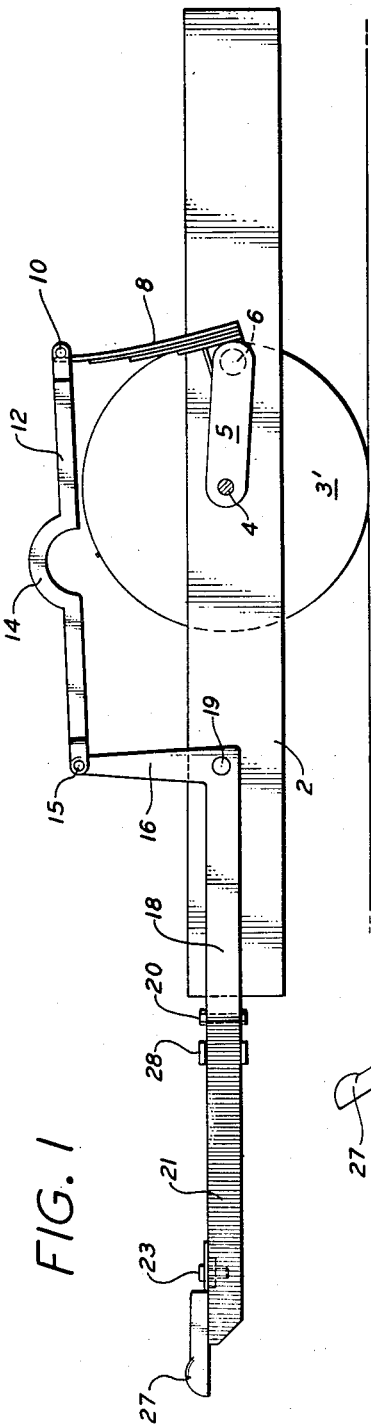
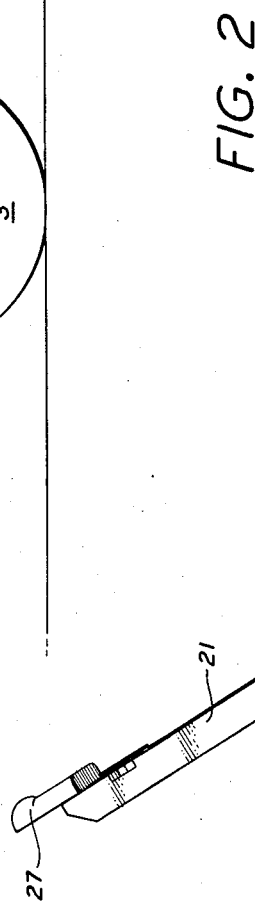
ARTHUR G. SCHRAMM,
INVENTOR.
BY Scott L. Nowel
ATTORNEY Sept. 22, 1959  A. G. SCHRAMM  2,905,481
MANUALLY OPERATED OPEN BED ELEVATABLE TRAILERS
Filed March 31, 1958  3 Sheets-Sheet 2
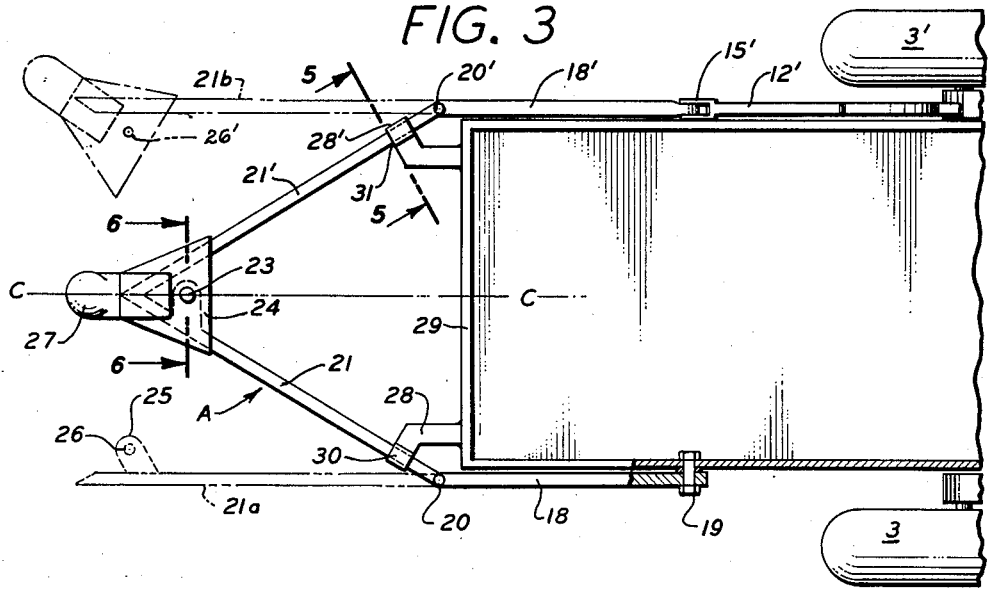
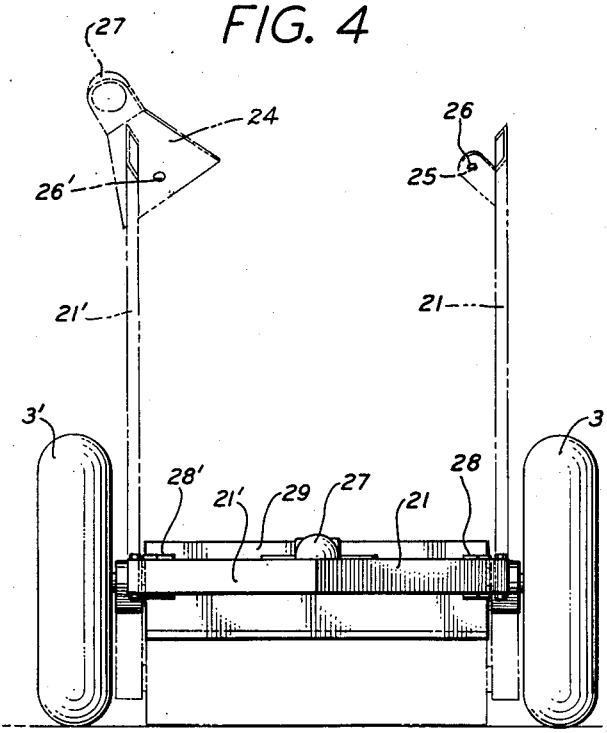
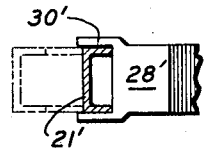
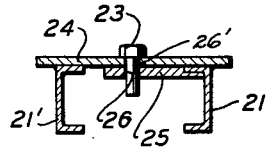
ARTHUR G. SCHRAMM,
INVENTOR.
BY *Scott L. Norvell*
ATTORNEY Sept. 22, 1959  A. G. SCHRAMM  2,905,481
MANUALLY OPERATED OPEN BED ELEVATABLE TRAILERS
Filed March 31, 1958  3 Sheets-Sheet 3
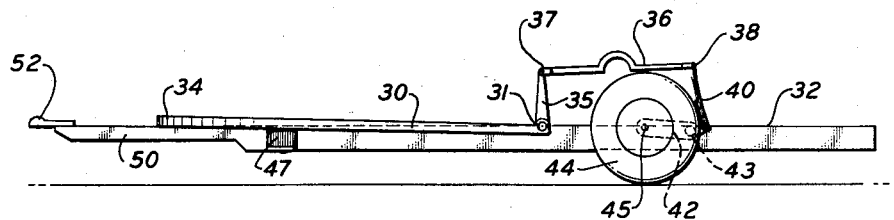
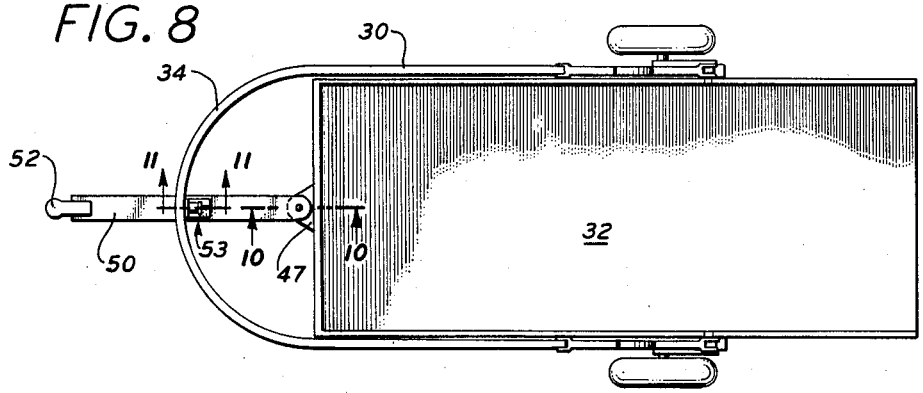
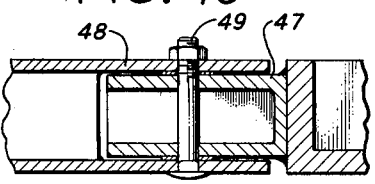
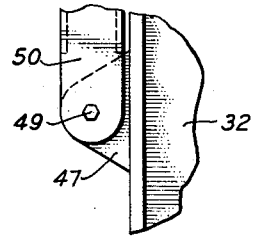
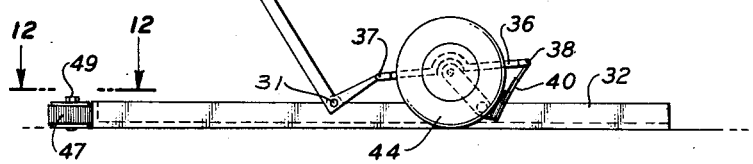
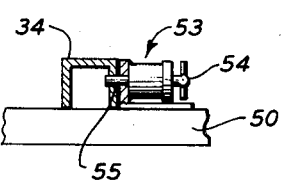
ARTHUR G. SCHRAMM,
INVENTOR.
BY *Scott L. Norris*
ATTORNEY

United States Patent Office 2,905,481
Patented Sept. 22, 1959

2,905,481

MANUALLY OPERATED OPEN BED ELEVATABLE TRAILERS

Arthur G. Schramm, Phoenix, Ariz.

Application March 31, 1958, Serial No. 725,000

6 Claims. (Cl. 280—43.18)

This invention concerns open bed elevatable trailers.

Heretofore many forms of elevatable bed trailers have been suggested none of which, however, provided adequate means for maintaining the bed open at both ends so that access may be had to the trailer bed for loading or unloading from either the front end or rear end.

In view of the foregoing one of the objects of my invention is to provide a trailer having a bed supported on wheels which may be raised or lowered with reference to the bed and resiliently supported, or sprung, by adequate springs to absorb road shocks, and provided with a tongue which, when the trailer is lowered, may be moved laterally and out of the way of the front end to permit ingress and egress therefrom;

Another object is to provide an elevatable bed trailer, which has wheels supported on wheel arms, with a tongue which may be laterally disposed away from the front of the trailer when desired; said tongue being made in two parts each of which are hinged to the side portions of the trailer at the rear and detachably joined at the front end and provided with a hitch;

Still another object is to provide a trailer, as above described, which has raising and lowering means together with means for pulling the trailer including a tongue and a hitch and means closely associated with the hitch to permit the wheels, on each side of the bed, to be raised and lowered by independent leverage means.

Other objects will appear hereinafter.

I attain the foregoing objects by means of the devices, parts and combinations of parts shown in the accompanying drawings, in which—

Figure 1 is a side elevational view of a trailer incorporating my improvements and with the wheels in riding position with the bed raised.

Figure 2 is a side elevational view of the trailer shown in Figure 1 with the bed lowered relative to the wheels and resting on the ground.

Figure 3 is a plan view of the forward portion of said trailer, as shown in Figure 1, with the tongue shown in the position necessary for towing in solid lines and with the forward portion of the tongue hinged outward as shown in dotted lines to a position to provide open access to the front end of the trailer and to permit each of the wheels be manually lowered by lever means.

Figure 4 is a front end view of the trailer with the tongue and hitch parts in the position necessary for towing, shown in solid lines, and with the forward portions of the tongue and hitch shown in dotted lines to indicate open position and the position necessary for manually raising and lowering the bed.

Figure 5 is a sectional view of a portion of the trailer tongue and a supporting bracket shown substantially on line 5—5 of Figure 3 and drawn on an enlarged scale.

Figure 6 is a sectional view of the front end portion of the tongue structure taken substantially on line 6—6 of Figure 3 and drawn on an enlarged scale.

Figure 7 is the side elevational view of a modified form of open bed elevatable trailer.

Figure 8 is a plan view thereof;

Figure 9 is a side elevational view of the trailer as trailer as shown in Figure 7 but in lowered position.

Figure 10 is a vertical sectional view of the rear end of the pulling tongue showing the hinged joint between the tongue and the front end of the trailer body and drawn on an enlarged scale substantially on line 10—10 of Figure 8.

Figure 11 is a sectional view of the latch portion of the elevating lever drawn on an enlarged scale and substantially on line 11—11 of Figure 8.

Figure 12 is a plan view of a fragment of the front end of the trailer body and the tongue drawn on an enlarged scale.

Similar numerals refer to similar parts in the several views.

The body 2 of the trailer is supported on laterally disposed wheels 3 and 3' which are each journalled on spindles 4 attached to the forward ends of wheel arms 5 and 5'. Each of the wheel arms is supported and journalled on stub shafts 6 and 6' attached to the sides of the trailer body. At the rear ends of each of the wheel arms there are quarter elliptical springs 8 and 8' which have their butt ends securely attached to the wheel arms and their free ends attached by a pivot 10 to operating links 12. These links are shaped with a centrally disposed arched section 14 in order to avoid contact with the wheel spindles 4 and 4' when the trailer bed is lowered, as shown in Figure 2. At the forward ends of the links they are pivotally attached by bolt pins 15 to the upwardly extending arms 16 of composite tongue levers 18 and 18'.

Each of these levers is pivoted to the trailer bed on pins 19 and 19' and each is provided with a vertically pinned joint indicated by numerals 20 and 20'.

Up to this point it is to be noted that the parts mentioned are indicated by numerals 16 and 16'. The numerals indicate those parts on the left hand side of the trailer bed as viewed in Figures 1 and 2 and those on the opposite or right hand side are indicated by the primed numbers, and are to be considered as right hand counter parts of those on the left hand side.

Referring to Figure 3, it will be noted that the joints 20 and 20' are arranged so that the forward portions 21 and 21' of the tongue may be hinged inwardly.

These parts meet at the longitudinal projected center line of the trailer bed as indicated by C—C. When the parts 21 and 21' are folded inwardly they are joined by means of a pin 23 which extends through a plate 24 attached to the front end of tongue part 21'. This plate is welded to the top face of the material from which the tongue part is made and it is disposed on this part so that when the left hand forward tongue part 21 is brought to the center line a tab 25, having a hole 26 will be in position to receive pin 23, as shown in Figure 6. At the front end of plate 24 there is a trailer hitch 27 of standard and usual construction.

In order to hold the tongue parts 21 and 21' in horizontal and extended position, when in the position for drawing or operating the trailer, there are two brackets 28 and 28' which are attached to the front edge 29 of the trailer bed and extend outwardly therefrom. Each of these brackets has a fork 30 at its front end which is adapted to receive and support the hinged fore parts of the trailer tongue. The tongue is indicated generally by the letter A.

In operation the trailer may be drawn or pulled by any suitable tractive vehicle when the parts are in position shown in solid lines in Figures 1, 3 and 4.

When it is desired to lower the trailer bed for loading or otherwise, the hitch 27 is disconnected and the pin 23 removed from pin hole 26 in plate 24 and the pin hole 26 in the tab 25. The forward portions 21 and 21' of the tongue structure are then hinged outward to positions indicated by dotted lines 21a and 21b, as shown in Figure 3. In this position, so long as the front portions 18 and 18' of the tongue are maintained horizontal, the bed 2 will remain elevated. When the portions 21 and 21' are moved outward they become levers, which, together with the rear portions 18 and 18', can be used to hinge on supports 19 and 19', which become fulcrums and operate through links 12 and 12' to move springs 8 and 8' so as to cause the wheel arms 5 and 5' to move to raise and lower the bed 2 relative to wheels 3 and 3'. When the levers are raised, as shown in solid lines in Figure 2, the bed will be lowered. When desired these parts which constitute levers may again be lowered and the bed raised.

This structure makes it possible to place objects, for example, such as a stock weighing scale B, in the trailer bed. The trailer may be lowered at any desired spot and the tongue parts moved out of the way laterally, as shown particularly in Figure 3. Stock may then be driven onto the scale from the rear end of the trailer to the forward end of the trailer and may be weighted on scale B. Suitable sides may be added to the trailer bed if desired, and the stock may be driven so that the animals may be quickly weighed successively on scale B.

In the modified form of this type of trailer, as shown in Figures 7 through 12, the operating levers 30 are pivoted on pins 31 to the bed 32 at a point substantially at the center of the length of the bed. Each side of the lever 30 extends forward beyond the front end of the trailer bed 32 and the forward side portions of the lever are joined by a semi-circular portion 34. Above the pivot 31 on each side of the trailer bed there are upwardly extending arms 35 which are parts of the levers 30. The upper ends of each of these upwardly extending arms are pivoted to a link 36 by pins 37. The aft end of this link is pivoted at 38 to the upper end of spring 40 which is the same as spring 8 previously mentioned in the first form of this trailer shown, particularly in Figures 1 and 2. The wheel arms 42 are supported on stub shafts 43 the same as the figures previously mentioned and the wheels 44 and their spindles 45 are likewise similar.

At the forward end of body 32 there is a bracket 47 which accommodates a clevis 48 at the rear end of tongue 50. A pin 49 provides a pivotal bearing between the bracket and clevis. At the front end of tongue 50 there is a conventional hitch 52. A spring loaded latch 53 having a latch pin 54 is mounted on the tongue 50 just to the rear of the position where the arcuate front part of the levers contacts the tongue. The latch pin 54 is adapted to enter a hole 55 in the rear portion of the arcuate lever portions 34 to secure this lever to the tongue when the trailer is being drawn by a vehicle attached to the hitch 52.

In operation, the bed 32 may be lowered by drawing latch pin 54 from the hole 55 to release the front portion of the two levers 30 and then raising the levers as shown in Figure 9. This moves link 36 to the rear and moves spring 40 likewise to the rear and moves the forward end of wheel arms 42 upward. Thus, the wheels 44 remain on the ground and the bed 32 will be lowered to the ground.

In this condition the tongue 50 may be pivoted on bolt 49 and swung to the right or left as desired so that neither the tongue nor any vehicle attached to it will be in the way of objects rolled onto the bed 32 or objects pushed through it longitudinally. Thus, this modified form can be used, in many cases, for the same purposes as the form first shown. In this modified form both the levers on each side of the body move together because of the semi-circular yoke portion 34. The levers do not interfere with objects brought onto or removed from the bed so long as they are of less height than the links and yoke 34 when raised.

In the above description the reference numbers refer to the parts indicated as written and apply primarily to the parts on the left side of the trailer. Where there are right hand counter parts these are indicated with primed numbers.

I claim:

1. In a manually operated open bed trailer a bed, wheels on each side thereof, supported by wheel arms pivotally journalled on each side of said bed, springs attached to said wheel arms and extending upwardly, levers on each side of said bed each being pivoted at one end to each side of said bed respectively; the opposite end portions of said levers being removably joined and forming a tongue; each lever having an arm extending upwardly from said pivot, links connecting the upper ends of said arms to the upper ends of said springs, the tongue having a hitch at its fore end pivotally connected to the fore end of said bed and extending forward from said connection and means for swinging said tongue structure away from the space in front of said bed to provide an open unobstructed front end for said bed.

2. In a manually operated open bed trailer a bed, wheels on each side thereof, supported by wheel arms pivotally journalled on each side of said bed, springs attached to said wheel arms and extending upwardly, lifting levers on each side of said bed to operate said springs, each having a horizontal forwardly extending portion and an upwardly extending arm, disposed substantially at right angles to said horizontal portion, links connecting the upper ends of the upwardly extending arms of said lifting levers and said springs by pivot joints, a tongue structure including the fore portions of said lifting levers and having a hitch at its fore part, being pivotally attached to the bed at its rear, for moving said tongue structure laterally in a horizontal plane away from the space in front of said bed to provide free egress from the front end of said bed.

3. In a manually operated open bed trailer a bed, wheels on each side thereof, supported by wheel arms pivotally journalled on each side of said bed, springs attached to said wheel arms and extending upwardly, lifting levers pivoted on each side of said bed to operate said springs, each having a horizontal forwardly extending portion and an upwardly extending arm, disposed substantially at right angles to said horizontal portion, links connecting the upper ends of said lever arms and said springs by pivot joints, each lifting lever having a movable fore portion swingably attached to its horizontal portion by a vertical pivot and normally extending forward and angularly inward, a hitch releasably attaching the fore ends of said movable fore portions of said levers at a position located forward of the central portion of the front of said bed; said movable fore portions of said lifting levers being adapted to hinge outward from the space in front of said bed to provide free access to and from the front of said bed.

4. In a manually operated open bed trailer a bed, wheels on each side thereof, supported by wheel arms pivotally journalled on each side of said bed, springs attached to said wheel arms and extending upwardly, lifting levers pivoted on each side of said bed to operate said springs, each having a horizontal forwardly extending portion and an upwardly extending arm, disposed substantially at right angles to said horizontal portion, links connecting the upper ends of said lever arms and said springs by pivot joints, a semi-circular arcuate lever portion connecting the front ends of said lifting levers, a tongue pivotally attached by a vertical pivot pin to the central portion of the front end of said bed, extending forward beneath the arcuate portion of said lifting levers and having a hitch at its fore end, and a latch on said tongue detachably joining it to the arcuate portion of said lifting levers.

5. A trailer, as described in claim 3, in combination with brackets on each side portion of the front end of the trailer bed having forks to support the forehinged portions of the lifting levers when they are swung inward to mutually attached riding position.

6. In a manually operated open bed trailer a bed, wheels on each side thereof, supported by wheel arms pivotally journalled on each side of said bed, springs attached to said wheel arms and extending upwardly, lifting levers pivoted on each side of said bed to operate said springs, each having a horizontal forwardly extending portion and an upwardly extending arm, disposed substantially at right angles to said horizontal portion, links connecting the upper ends of said lever arms and said springs by pivot joints, a semi-circular arcuate lever portion connecting the front ends of said lifting levers, a tongue attached to the central portion of the front end of said bed, extending forward beneath the arcuate portion of said lifting levers and having a hitch at its fore end, and a latch on said tongue detachably joining it to the arcuate portion of said lifting levers.

References Cited in the file of this patent

UNITED STATES PATENTS

| | | |
|---|---|---|
| 2,442,071 | Bunten | May 25, 1948 |
| 2,478,795 | Whalen | Aug. 9, 1949 |
| 2,568,261 | Stade | Sept. 18, 1951 |
| 2,650,730 | Rohm | Sept. 1, 1953 |
| 2,805,867 | Schramm | Sept. 10, 1957 |